United States Patent
Kraft

(10) Patent No.: US 11,028,733 B2
(45) Date of Patent: Jun. 8, 2021

(54) COAL PLANT SUPPLEMENTARY AIR AND EXHAUST INJECTION SYSTEMS AND METHODS OF OPERATION

(71) Applicant: POWERPHASE LLC, Jupiter, FL (US)

(72) Inventor: Robert J. Kraft, Tequesta, FL (US)

(73) Assignee: Powerphase International, LLC, Hobe Sound, FL (US)

( * ) Notice: Subject to any disclaimer, the term of this patent is extended or adjusted under 35 U.S.C. 154(b) by 278 days.

(21) Appl. No.: 16/087,897

(22) PCT Filed: Mar. 23, 2017

(86) PCT No.: PCT/US2017/023734
§ 371 (c)(1),
(2) Date: Sep. 24, 2018

(87) PCT Pub. No.: WO2017/165598
PCT Pub. Date: Sep. 28, 2017

(65) Prior Publication Data
US 2020/0300127 A1 Sep. 24, 2020

Related U.S. Application Data

(60) Provisional application No. 62/312,046, filed on Mar. 23, 2016.

(51) Int. Cl.
| | |
|---|---|
| *F01K 7/02* | (2006.01) |
| *F01K 11/02* | (2006.01) |
| *F01K 23/10* | (2006.01) |
| *F02C 3/30* | (2006.01) |
| *F02C 3/34* | (2006.01) |
| *F02C 6/16* | (2006.01) |

(Continued)

(52) U.S. Cl.
CPC .............. *F01K 7/02* (2013.01); *F01K 11/02* (2013.01); *F01K 23/10* (2013.01); *F02C 3/30* (2013.01); *F02C 3/34* (2013.01); *F02C 6/16* (2013.01); *F02C 9/52* (2013.01); *F22B 37/48* (2013.01)

(58) Field of Classification Search
CPC .......... F01K 11/02; F01K 23/06; F01K 23/10; F01K 7/02; F02C 3/30; F02C 3/34; F02C 6/16; F02C 9/52; F22B 37/48; Y02E 60/16
See application file for complete search history.

(56) References Cited

U.S. PATENT DOCUMENTS

| | | |
|---|---|---|
| 3,151,250 A | 9/1964 | Carlson |
| 4,347,706 A | 9/1982 | Drost |
| (Continued) | | |

FOREIGN PATENT DOCUMENTS

JP 2007-192417 A 8/2007

OTHER PUBLICATIONS

Jun. 7, 2017, International Search Report and Written Opinion for International Patent Application No. PCT/US2017/023734, 11 pages.

*Primary Examiner* — Jesse S Bogue
(74) *Attorney, Agent, or Firm* — Avant Law Group, LLC

(57) ABSTRACT

The invention relates generally to electrical power systems or steam generator systems including generating capacity of a coal plant where specific emissions and power is improved with an alternately fueled engine driving one or more air processes.

19 Claims, 3 Drawing Sheets

(51) Int. Cl.
    *F02C 9/52*     (2006.01)
    *F22B 37/48*    (2006.01)

(56) References Cited

U.S. PATENT DOCUMENTS

| | | | | |
|---|---|---|---|---|
| 4,441,028 | A | * | 4/1984 | Lundberg ................... F02C 6/16 |
| | | | | 290/52 |
| 4,488,516 | A | * | 12/1984 | Bueters .................... F22B 37/48 |
| | | | | 110/185 |
| 4,630,436 | A | * | 12/1986 | Frutschi .................. F02C 3/205 |
| | | | | 60/39.183 |
| 5,297,959 | A | | 3/1994 | Hemsath |
| 5,740,673 | A | * | 4/1998 | Smith ..................... F01K 23/068 |
| | | | | 60/783 |
| 6,035,628 | A | | 3/2000 | Dryden |
| 6,750,557 | B2 | * | 6/2004 | Poteet ...................... F01D 15/10 |
| | | | | 290/52 |
| 6,892,679 | B2 | | 5/2005 | Jameel et al. |
| 6,912,451 | B2 | * | 6/2005 | Poteet ........................ H02J 3/06 |
| | | | | 700/287 |
| 7,507,381 | B2 | * | 3/2009 | Muramoto ............... F23J 15/06 |
| | | | | 422/173 |
| 9,476,582 | B2 | * | 10/2016 | Abeyta ...................... F28G 1/16 |
| 2012/0137877 | A1 | | 6/2012 | Zauderer |
| 2014/0041358 | A1 | | 2/2014 | Shibata et al. |
| 2014/0250902 | A1 | | 9/2014 | Kraft |
| 2015/0107498 | A1 | * | 4/2015 | Sun ...................... B01D 53/508 |
| | | | | 110/342 |
| 2017/0211900 | A1 | * | 7/2017 | Kubo ................... F01K 13/003 |

* cited by examiner

COAL PLANT SUPPLEMENTARY AIR AND EXHAUST INJECTION SYSTEMS AND METHODS OF OPERATION

CROSS-REFERENCE TO RELATED APPLICATIONS

This application is a 35 U.S.C. § 371 filing of International Patent Application No. PCT/US2017/023734, filed Mar. 23, 2017, which claims priority to U.S. Provisional Patent Application Ser. No. 62/312,046, filed Mar. 23, 2016. The entire contents of these applications are incorporated herein by reference for all purposes.

TECHNICAL FIELD

The invention relates generally to electrical power systems, including generating capacity of a coal plant, and more specifically to improving the existing coal plant's capacity while at the same time improving overall plant efficiency and reducing specific emissions.

BACKGROUND OF THE INVENTION

Currently, coal plants have significant parasitic loads that are used to drive the air from the atmosphere through the combustion chamber of the boiler as well as soot blowers to keep the boiler walls and steam pipes clean. These systems use electrical power generated from the coal plant to drive the electric motors that run the main air blowers and soot blower air compressor. Typically, the main air blower is a low pressure compressor, providing less than 5 psi, and the soot blower typically operates at a much higher pressure, 125-150 psi. The main air blower is typically a single stage fan and the soot blower is a multi-stage integrally-geared turbo compressor.

The main air blower delivers all of the air to the combustion chamber of the coal-fired boiler at about the same temperature as the ambient conditions. Because the pressure increase across the main air blower is very low, the temperature rise is extremely small, less than one degree Fahrenheit.

The soot blower delivers air to a variety of places and is used keep boiler walls and tubes clean. This air is generated with a multi-stage intercooled compressor which delivers high pressure air at about 200-250 deg. F. The air is directed to the different areas of the boiler combustion chamber to keep it clean and ultimately is part of the combustion process.

In many parts of the world, coal is a much less expensive fuel than diesel or natural gas. For example in some countries, coal costs between $2 and $3 per MBTU, where natural gas and diesel is approximately $15/MMBTU. Therefore, coal is used for base load power while the more expensive fuels, such as diesel and natural gas, are used for peaking power.

Stable electrical grids require approximately 1-2% spinning reserve, also referred to as extra generating capacity, and for coal-fired plants, this is accomplished primarily by running the coal plants at 98-99% load, leaving the remaining 1-2% available in the event additional power is needed on the grid quickly. Recently, batteries have been installed at some coal plants to provide the 1-2% spinning reserve power, thus allowing the coal plant to operate at 100% load. By doing this, effectively the grid can get an additional 1-2% more power on the grid from the coal plants before having to start more expensive fuel power generation systems, like a peaking gas turbine which can have a heat rate of 11,000 BTU/kWh. The battery systems are costly, approximately $1000/kw, however, because extra power can be generated year round with the less expensive fuel, there is a relatively quick payback on the investment required. For example a 10 MW battery at $1000/kw costs $10M USD. This allows 10 MW to be put on the grid at a differential fuel price of $15-3=$12/MMBTU for 8760 hours, or 87,000 MWh at a heat rate of 11,000 BTU/kWh, yields an annual fuel savings of $11.5M, therefore requiring less than 10 years return on investment.

FIG. 1 shows a typical coal plant of the prior art. At the heart of the coal plant is a steam turbine which can consist of a high pressure turbine 1, an intermediate pressure turbine 2, and a low pressure turbine 3 which are typically arranged to have the same shaft line as the generator 4 that they are driving. High pressure steam 5 is generated in the boiler section 17 of the coal plant and feeds the high pressure turbine 1, which drops the pressure and temperature of the steam. This intermediate pressure steam 6 travels back to the boiler section 17 of the coal plant where the temperature is increased. The reheated intermediate pressure steam 7 travels back to intermediate pressure turbine 2, where the steam pressure and temperature is dropped as the steam powers intermediate pressure turbine 2. The low pressure steam 8 exits the intermediate pressure turbine 2 and enters the low pressure turbine 3, where the remainder of energy is extracted from the steam. The three stages of turbines drive the generator 4 producing electric power delivered to the grid. The steam leaving the low pressure turbine 3 is saturated steam and the cooling tower 25 cools this stream completely to the liquid phase and then returned to the process via a duct 9 to start the cycle over again.

At a coal plant all of the energy is generated by burning coal. Referring still to FIG. 1, this process requires delivering coal 13 to the plant, where the coal is ground up into fine particles and enters a mixer 12 that mixes the coal particles with air 11. The mixture is pumped into the plant with an electric or steam driven main air blower 28. The mixed coal and air 10 is injected into the combustion zone of the boiler 17 where the mixture is burned producing hot gasses and ash. The hot gasses heat water in the boiler 17 to generate steam. The ash is typically directed to a collector 14 and a conveyor system continuously removes the ash. However, some of the ash collects on the walls of the boiler 17 as well as the steam pipes. To prevent unwanted build-up of ash, electrical driven soot blowers 18 produce pressurized warm air 54 at approximately 150-200 psi and approximately 225 deg. F. Some systems use intermediate steam instead of air for the soot blower. The pressurized air or steam is injected with nozzles at several locations inside the boiler to keep the walls and pipes free of ash to maximize heat transfer to the steam pipes. Ignition sources keep the flame lit and the hot gasses move up through the combustion zone where they are in fluid contact with the high pressure steam pipes 31, then the intermediate pressure steam pipes 32, and then the gas exhausts 15 out of the coal plant.

SUMMARY

The current invention provides a system and method to use a fuel driven blower to deliver the main combustion air to the coal boiler combustion process as well as the high pressure air to the soot blower system.

In an embodiment of the present invention, a coal-fired energy system is provided comprising a coal-fired steam generator having a coal feed system and a main air feed system for producing heat to a boiler for producing steam, one or more steam turbines in fluid communication with the steam generator, piping for passing the steam between the steam generator and the one or more steam turbines, and an auxiliary air compression system providing compressed air for a soot blower of the coal-fired steam generator and waste heat to a combustion zone of the coal-fired steam generator.

In another embodiment of the present invention, a method of operating a coal-fired energy system is provided comprising operating a coal fired steam generator comprising a coal feed system and a main air feed system to provide a coal-air mixture as a heating source for a boiler for generating steam. An auxiliary air compression system is also operated comprising a fueled engine coupled to a compressor for providing an auxiliary supply of compressed air to a soot blower of the coal-fired steam generator, and the supply of compressed air is injected along walls of the boiler to remove soot and ash buildup from the boiler.

In yet another embodiment of the present invention, a coal-fired energy system is provided comprising a coal-fired steam generator having a coal feed system and a main air feed system for producing heat to a boiler for producing steam. The system also comprises one or more steam turbines in fluid communication with the steam generator, piping for passing the steam between the steam generator and the one or more steam turbines, and, an auxiliary air compression system capable of providing compressed air for a soot blower of the coal-fired steam generator and comprising a compressor selectively driven by an electric motor or a fueled engine.

In another embodiment of the present invention, a method of operating a coal-fired energy system is provided comprising operating a coal fired steam generator comprising a coal feed system and a main air feed system to provide a coal-air mixture as a heating source for a boiler for generating steam and operating an auxiliary air compression system comprising a compressor for providing an auxiliary supply of compressed air to a soot blower of the coal-fired steam generator, where the compressor is selectively coupled to a fueled engine or an electric motor. Then, the supply of compressed air is injected along walls of the boiler to remove soot and ash buildup from the boiler.

One aspect of the present invention relates to methods of producing main combustion air using an alternately fueled engine to drive the process that results in less specific emissions and increased plant output.

Another aspect of the present invention relates to a method for producing air for a soot blower using an alternately fueled engine resulting in lower emissions and increased plant output.

Another aspect of the present invention provides a method of preheating the soot blower air prior to injecting the air into the coal boiler, resulting in an increased output from the plant.

Another aspect of the present invention provides a method of dispensing of the waste heat from an alternately fueled engine to increase the power output of the coal plant.

In yet another aspect of the present invention, there is provided a way for the main auxiliary systems, including the primary air and/or the soot blowing system to be able to run on a separately fueled system such that the auxiliary load can be transmitted to the grid to provide spinning reserve.

Other advantages, features and characteristics of the present invention, as well as the methods of operation and the functions of the related elements of the structure and the combination of parts will become more apparent upon consideration of the following detailed description and appended claims with reference to the accompanying drawings, all of which form a part of this specification.

BRIEF DESCRIPTION OF THE SEVERAL VIEWS OF THE DRAWINGS

The present invention is described in detail below with reference to the attached drawing figures, wherein.

DETAILED DESCRIPTION

The present invention relates to systems and methods of generating the main combustion air for a coal boiler, as well as the soot blower air with an alternately fueled engine, such as a natural gas reciprocating engine. Because of the emission concerns of coal plants, there is significant pressure to reduce emissions and improve efficiency of existing coal plants. Also, because of this pressure, many coal plants are being demolished and replaced with natural gas fired combustion gas turbines.

The main air blower and soot blower draws a parasitic load of about 5% of the coal plant output. The current invention provides an alternate, more efficient way of providing lower emissions by generating the pressurized air for the soot blower and the main combustion air at the coal plant.

Figure 1:
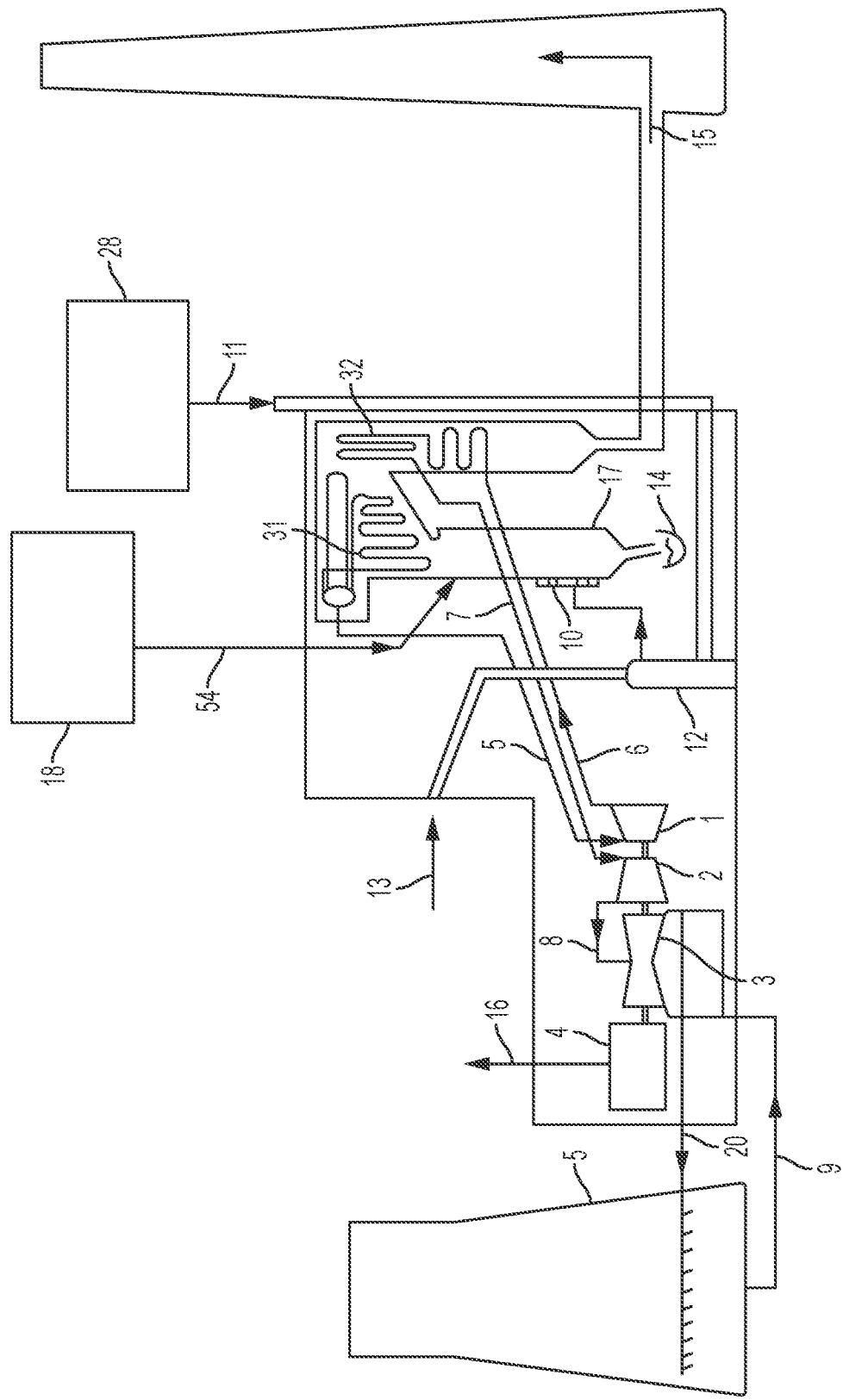
FIG. 1 is a schematic drawing of a typical coal plant of the prior art.
Figure 2:
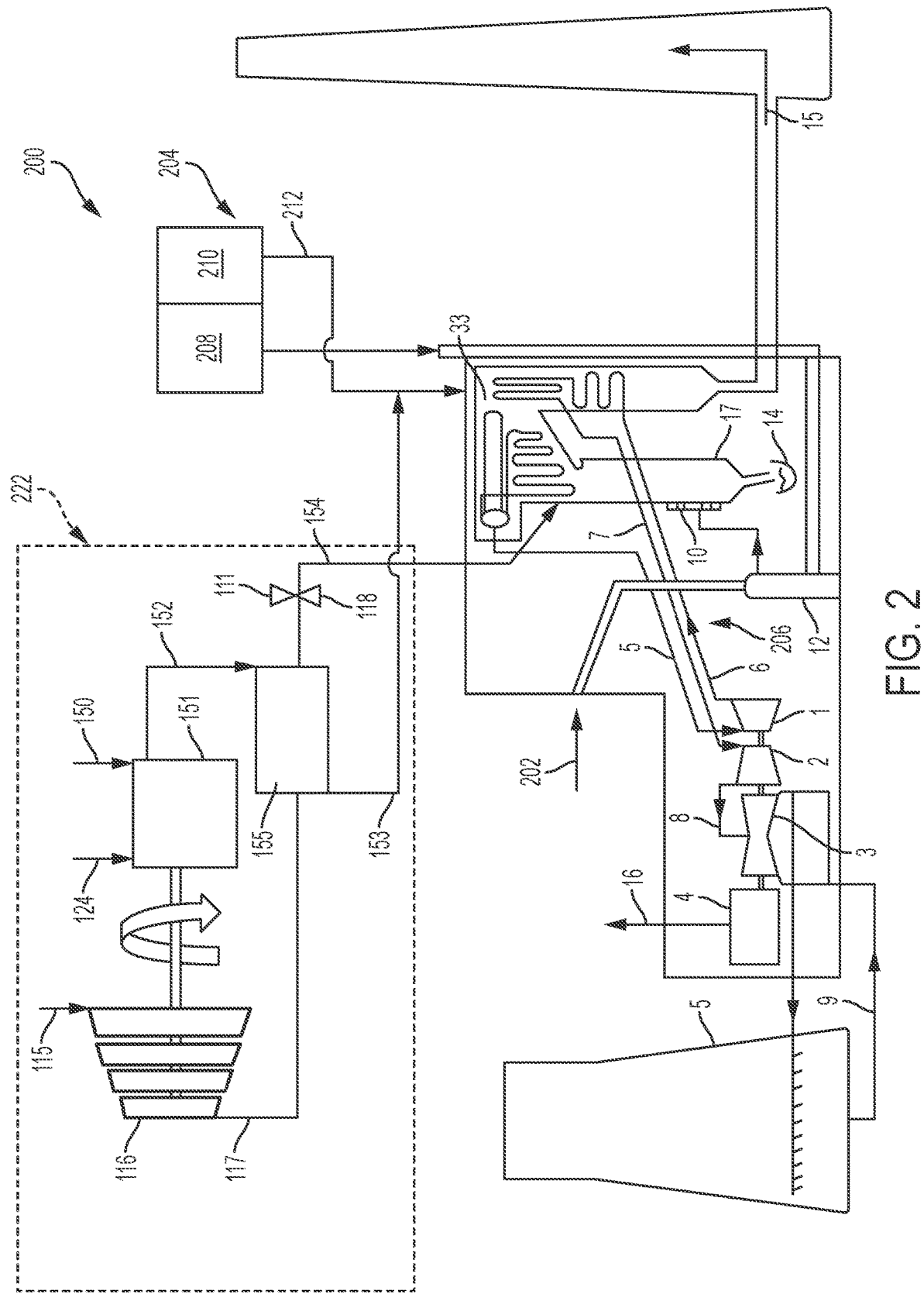
FIG. 2 is a schematic drawing of a typical coal plant incorporating an embodiment of the present invention.

Referring now to FIG. 2, an embodiment of the present invention comprises a coal-fired energy system 200 having a coal-fired steam generator with a coal feed system 202 and a main air feed system 204, together producing heat for the boiler 17 which in turn produces steam. The coal feed system 202 provides a pulverized coal to a mixer 12 where it mixes with air from the main air feed system 204. This mixture of coal and air 10 is injected into the combustion zone of the boiler 17 where it is burned and used to heat the boiler 17. The main air feed system 204 comprises a main air blower 208 that is powered by a fueled engine 210. The fueled engine also generates waste heat 212 that is directed towards the combustion zone of the coal boiler 33.

The coal energy system 200 also comprises one or more steam turbines in fluid communication with the steam generator. In the embodiment depicted in FIGS. 2 and 3, the one or more steam turbines comprise a high pressure turbine 1, an intermediate pressure turbine 2, and a low pressure turbine 3.

The present invention also comprises piping 206 for passing the steam between the steam generator and the one or more turbines. More specifically, the piping 206 includes a conduit for passing high pressure steam 5 to the high pressure turbine 1, a conduit for returning steam at an intermediate pressure 6 to the boiler 17 for reheating, and a conduit for directing the reheated intermediate pressure steam 7 from the boiler to the intermediate pressure turbine 2. The piping 206 also includes a conduit for supplying low pressure steam from the intermediate pressure turbine 2 to the low pressure turbine 3.

The present invention also comprises an auxiliary air compression system 222. The auxiliary air compression system 222 comprises a fueled engine 151 that drives a multi-stage intercooled compressor 116 which takes in ambient air 115 and discharges warm compressed air 117. The fueled engine 151, which can operate on natural gas, biofuel, off-gas, or another non-coal fuel source, takes in ambient air 150 and fuel 124 and delivers the power to drive the intercooled compressor 116 and discharges hot exhaust 152 which goes through a recuperator 155 where it heats the warm compressed air 117 to generate hot compressed air 118. When the air injection valve 111 is open, the hot compressed air can flow from the recuperator 155 through the soot blower air injection piping 154 and to the boiler 17.

A fuel-driven main air blower 208 utilizes a fueled engine 210 to drive the blower 208. The exhaust 212 of this fueled engine 210 is joined with the exhaust 153 of the power augmentation system 222 and is routed to the combustion zone of the coal boiler 33.

The combination of eliminating the electric driven soot blower and main air blower of the prior art automatically increases the output of the plant by approximately 5%. Additionally, because the soot blower air 154 is heated and the exhaust energy from the fueled engines 151 and 210 is added to the combustion zone of the boiler 17, an additional 2% increase in power can be realized, for a total of approximately 7% additional power output. This means that the coal fuel rate can be reduced by 7% and substituted with natural gas reciprocating engines to drive the soot blower system and the main air delivery system 204 resulting in less coal being burned. The main pollutant of a coal plant, sulfur dioxide ($SO_2$), is about one hundred times more concentrated than the emissions of a typical natural gas reciprocating engine. Therefore, the specific emissions of the power plant is reduced almost 7% through the present invention. There are several other electric driven systems that can be driven with natural gas, like ash handling equipment, that can further increase this number.

In an alternate embodiment of the present invention, a method of operating a coal fired energy system is provided. A coal-fired steam generator is operated, where the steam generator comprises a coal feed system and a main air feed system working together to provide a coal-air mixture as a heating source for a boiler for generating steam. An auxiliary air compression system is operated to produce a supply of compressed air to a soot blower. The compressed air is then injected along walls of the boiler to remove soot and ash buildup from the boiler.

Figure 3:
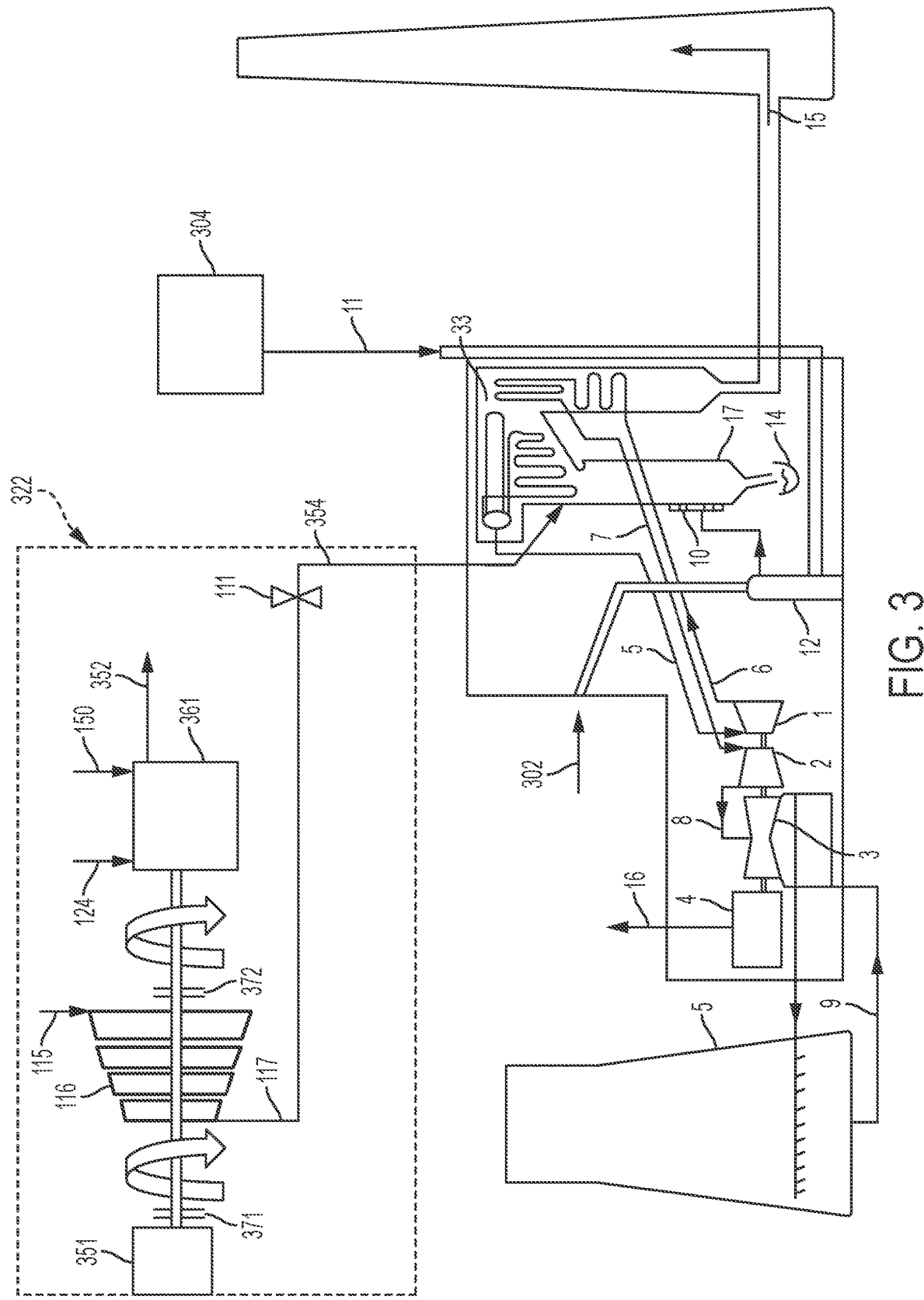
FIG. 3 is a schematic drawing of a typical coal plant incorporating an alternate embodiment of the present invention.

Referring now to FIG. 3, an alternate embodiment of the present invention is depicted. A coal-fired energy system 300 is provided as an alternate system to the coal-fired energy system 200 of FIG. 2, and includes significant differences.

The coal-fired energy system 300 comprises a coal-fired steam generator having a coal feed system 302 and a main air feed system 304 for producing a coal-air mixture to use as fuel for boiler 17. As with the coal-fired energy system 200 discussed above, this embodiment also includes one or more steam turbines 1, 2, and 3, in fluid communication with the steam generator and piping for passing the steam between the steam generator and the one or more steam turbines. The coal-fired energy system 300 comprises an auxiliary air compression system 322 capable of providing compressed air 354 to a soot blower, where the compressed air is produced by way of a multi-stage intercooled compressor 116, where the compressor is selectively driven by an electric motor 351 or a fueled engine 361. The compressor 116 is coupled to the electric motor 351 and the fueled engine 361 by clutches 371 and 372, respectively. Since the primary driver for this type of arrangement is spinning reserve, the electric motor is the primary driver and the diesel engine is the backup driver. When extra spinning reserve is required from the plant, the diesel engine 361 is started and takes over the power required to drive the compressor 116, and therefore the compressor load is delivered to the grid. The fueled engine 361 can be powered with natural gas, biofuel, off-gas or another non-coal fuel source and produces shaft power to drive the compressor 116 and engine exhaust 352 is vented to the atmosphere.

In another embodiment of the present invention, a method of operating a coal fired energy system is provided. A coal-fired steam generator is operated, where the steam generator comprises a coal feed system and a main air feed system working together to provide a coal-air mixture as a heating source for a boiler for generating steam. An auxiliary air compression system is operated to produce a supply of compressed air to a soot blower, where the compressor is selectively coupled to a fueled engine or an electric motor. The compressed air is then injected along walls of the boiler to remove soot and ash buildup from the boiler.

Similarly, other coal plant systems that are typically electrically driven with electric motors can be dual driven with diesel engines and electric motors to provide more spinning reserve power. Another good example of this is the primary air blower 328, which can be run with both an electric motor and a diesel engine in the same fashion to provide additional spinning reserve power to the grid. Other examples include ash handling and other conveying equipment at the plant.

While the invention has been described in what is known as presently the preferred embodiment, it is to be understood that the invention is not to be limited to the disclosed embodiment but, on the contrary, is intended to cover various modifications and equivalent arrangements within the scope of the following claims. The present invention has been described in relation to particular embodiments, which are intended in all respects to be illustrative rather than restrictive.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

The invention claimed is:

1. A coal-fired energy system comprising:
  a coal-fired steam generator having a coal feed system and a main air feed system for producing heat to a boiler for producing steam;
  one or more steam turbines in fluid communication with the steam generator;
  piping for passing the steam between the steam generator and the one or more steam turbines; and,
  an auxiliary air compression system capable of providing compressed air for a soot blower of the coal-fired steam generator and comprising a compressor selectively coupled to an electric motor or a fueled engine;
  wherein coupling the compressor with the fueled engine enables the coal-fired steam generator to deliver a power load to an electrical grid that is greater than a power load delivered to the electric grid when the compressor is coupled to the electric motor.

2. The coal-fired energy system of claim 1, wherein the compressor is connected to the electric motor or the fueled engine by a clutch.

3. The coal-fired energy system of claim 1, wherein the coal-fired steam generator comprises the coal feed system in communication with a mixer, the mixer receiving an air supply from a main air blower, the mixer providing a coal-air mixture to a combustion zone of the boiler.

4. The coal-fired energy system of claim 1, wherein the main air feed system comprises a main air blower driven by a second fueled engine.

5. The coal-fired energy system of claim 1, wherein the auxiliary air compression system comprises a fueled engine providing shaft output power and heated exhaust, a multi-stage intercooled compressor selectively coupled to the fueled engine, and an electric motor also selectively coupled to the multi-stage intercooled compressor.

6. The coal-fired energy system of claim 5, wherein the fueled engine utilizes natural gas, biofuel, off-gas, diesel, or a fuel source other than coal.

7. The coal-fired energy system of claim 1, wherein the one or more steam turbines comprises a high pressure turbine, an intermediate pressure turbine, and a low pressure turbine.

8. The coal-fired energy system of claim 7, wherein the piping comprises a first supply line for directing steam to the high pressure turbine, a return line for directing steam from the high pressure turbine back to the boiler, and a second supply line for directing reheated steam from the boiler to the intermediate pressure turbine of the one or more steam turbines and a third supply line for directing low pressure steam from the intermediate pressure turbine to the a low pressure turbine.

9. A method of operating a coal fired energy system comprising:
  operating a coal fired steam generator comprising a coal feed system and a main air feed system to provide a coal-air mixture as a heating source for a boiler for generating steam;
  operating an auxiliary air compression system comprising a compressor for providing an auxiliary supply of compressed air to a soot blower of the coal-fired steam generator, where the compressor is selectively coupled to a fueled engine or an electric motor;
  injecting the supply of compressed air along walls of the boiler to remove soot and ash buildup from the boiler; and,
  increasing the power load delivered to an electrical grid by the coal fired steam generator by decoupling the electric motor from the compressor and coupling the fueled engine to the compressor.

10. The method of claim 9, wherein the main air feed system provides air to a mixer for mixing with pulverized coal prior to being injected into the boiler.

11. The method of claim 9, wherein the auxiliary air compression system provides a supply of compressed air that is generated by the fueled engine providing shaft power to drive the compressor.

12. The method of claim 9, wherein the auxiliary air compression system provides a supply of compressed air that is generated by the electric motor providing shaft power to drive the compressor.

13. The method of claim 9, wherein providing an auxiliary supply of compressed air to a soot blower is selectively controlled by an air injection valve.

14. A method of operating a coal fired energy system comprising:
  operating a coal fired steam generator comprising a coal feed system and a main air feed system to provide a coal-air mixture as a heating source for a boiler for generating steam;
  operating an auxiliary air compression system comprising a compressor for providing an auxiliary supply of compressed air to a soot blower of the coal-fired steam generator, where the compressor is selectively coupled to a fueled engine or an electric motor; and,
  injecting the supply of compressed air along walls of the boiler to remove soot and ash buildup from the boiler;
  wherein the compressor is selectively coupled to the fueled engine or the electric motor to modify the power output of the coal fired steam generator based on a power output requirement.

15. The method of claim 14, wherein the main air feed system provides air to a mixer for mixing with pulverized coal prior to being injected into the boiler.

16. The method of claim 14, wherein the auxiliary air compression system provides a supply of compressed air that is generated by the fueled engine providing shaft power to drive the compressor.

17. The method of claim 14, wherein the auxiliary air compression system provides a supply of compressed air that is generated by the electric motor providing shaft power to drive the compressor.

18. The method of claim 14, wherein providing an auxiliary supply of compressed air to a soot blower is selectively controlled by an air injection valve.

19. The method of claim 14, wherein the compressor is selectively coupled to the fueled engine or the electric motor by clutches.

* * * * *